United States Patent
Gundersen et al.

[11] Patent Number: 5,603,893
[45] Date of Patent: Feb. 18, 1997

[54] POLLUTION TREATMENT CELLS ENERGIZED BY SHORT PULSES

[75] Inventors: Martin A. Gundersen, San Gabriel; Victor Puchkarev, Los Angeles; Iosef Yampolsky, Torrance, all of Calif.

[73] Assignee: University of Southern California, University Park, Calif.

[21] Appl. No.: 512,463

[22] Filed: Aug. 8, 1995

[51] Int. Cl.$^6$ .................. A61L 2/00; B01J 19/08
[52] U.S. Cl. .................. 422/22; 422/121; 422/186.03; 422/186.04; 588/212
[58] Field of Search .................. 422/22, 121, 186.04, 422/186.03, DIG. 906; 588/212

[56] References Cited

U.S. PATENT DOCUMENTS

| | | | |
|---|---|---|---|
| 3,653,185 | 11/1972 | Scott et al. | 55/103 |
| 4,555,303 | 11/1985 | Legge et al. | 156/643 |
| 4,883,570 | 11/1989 | Efthimron et al. | 204/64 |
| 5,236,672 | 8/1993 | Ninez et al. | 422/186.04 |

OTHER PUBLICATIONS

Non–Thermal Plasma Techniques for Pollution Control: Part A—Overview, Fundamentals and Supporting Technologies, edited by B. M. Penetrante and S. E. Shultheis (Springer–Verlag, Heidelberg, 1993).

Non–Thermal Plasma Techniques for Pollution Control: Part B—Electron Beam and Electrical Discharge Processing, edited by B. M. Penetrante and S. E. Schulteis (Springer–Verlag, Heidelberg, 1993).

D. Evans, L. A. Kosocha, G. K. Anderson, J. J. Coogan and M. J. Kushner, J. Appl. Phys. 74, 5378 (1993).

T. Mill, D. Yao, M. Su, S. Matthews and F. Wang, First Int. Conf. on Advanced Oxidation Technologies for Water and Air Remediation, (London, Ontario, Canada, 1994) pp. 145–146.

L. A. Rosocha, G. K. Anderson, L. A. Bechtold, J. J. Coogan, H. G. Heck, M. Kang, W. H. McCulla, R. A. Tennant, and P. J. Wantuck, Non–Thermal Plasma Techniques for Pollution Contro: Part B—Electron Beam and Electrical Discharge Processing, edited by B. M. Penetrante and S. E. Schultheis (Springer–Verlag, Heidelberg, 1993) pp. 281–308.

*Primary Examiner*—Nina Bhat
*Attorney, Agent, or Firm*—Kenway & Crowley

[57] ABSTRACT

Apparatus and method for the treatment of pollutants in gases which includes a plasma reactor chamber having sawtooth electrodes through which said gases flow, a generator of high voltage pulses of short width, high repetition rate and rapid rise time being coupled to said reactor with matched impedance, causing pulsed streamer discharges to be initiated at said chamber electrodes, increasing the effective plasma volume for more efficient pollutant reduction.

6 Claims, 1 Drawing Sheet

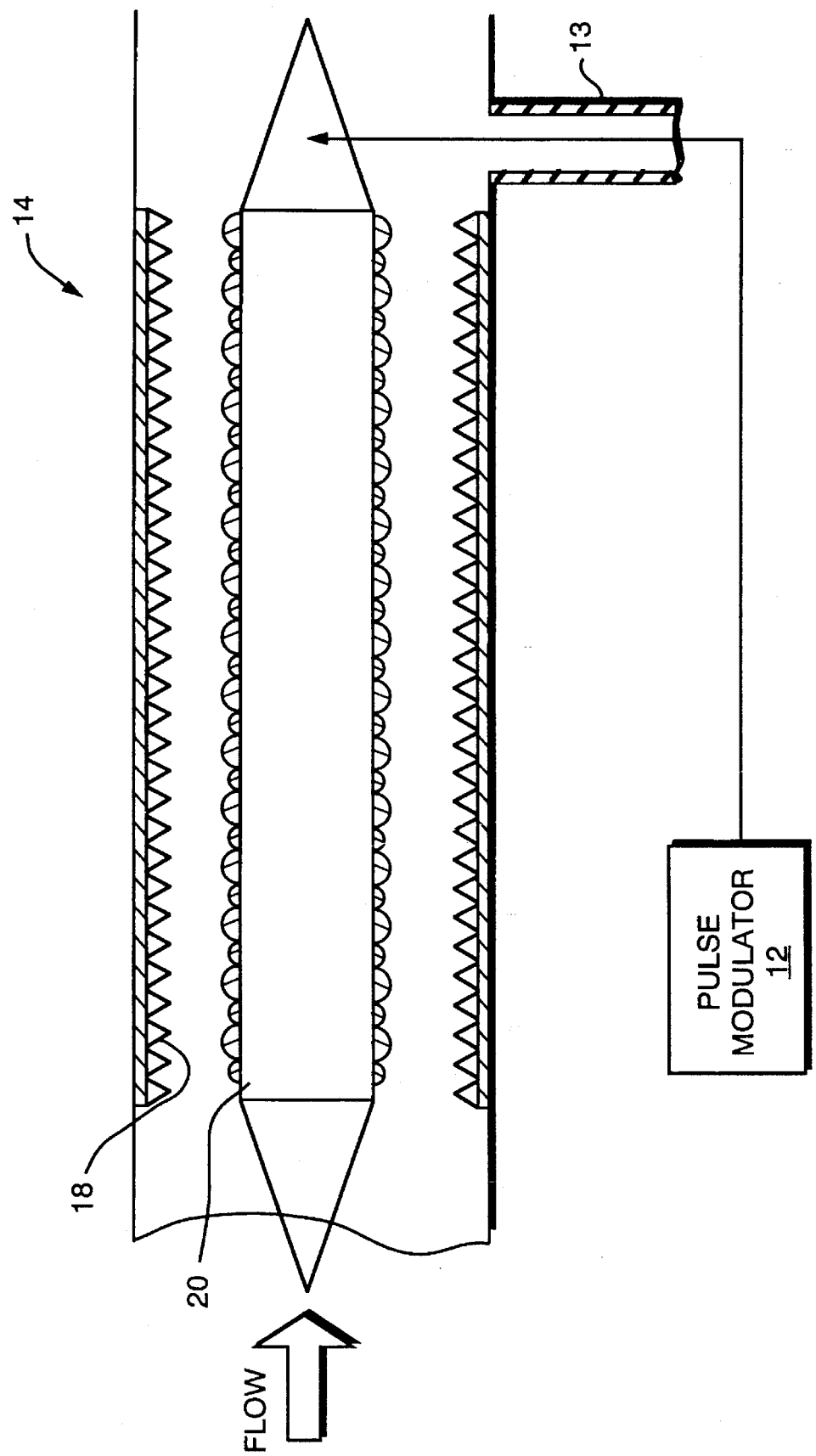

POLLUTION TREATMENT CELLS ENERGIZED BY SHORT PULSES

This invention relates in general to the treatment of gaseous pollutants, such as nitrous oxide, particulates, volatile organic compounds, mercury, and other pollutants, from engines, smokestacks, incinerators, and in particular to a method and apparatus for such treatment using a pulsed electrical discharge.

BACKGROUND OF THE INVENTION

Electrostatic precipitators are well known and commonly utilized especially in controlling particulate emissions. Other forms of electrical discharge devices for the same or similar purposes are less well known but available. For example, there are corona cells, pulsed corona cells, silent barrier discharge devices and surface discharge devices which are also receiving attention.

Generally, in electrostatic precipitators, a high voltage is applied to electrodes to produce a corona discharge. Dust or droplets in the gas flowing through the device are charged by electrons and ions of the corona discharge and they are then attracted to and collected by an oppositely charged electrode. It is known that the collection efficiency of these devices can be increased if beam-like electrons (electrons having energies higher than about 50 electron volts) are used rather than lower energy thermal-like electrons (electrons having energies typically less than 10 electron volts). In fact, thermal electrons in precipitation chambers typically have energies as low as one electron volt.

Thermal electrons are produced about 50 nanoseconds after a high-voltage pulse is applied and the higher energy beam-like electrons are dissipated as soon as the thermalized electrical discharge takes place. It would be desirable of course to produce beam-like electrons rather than thermal-like electrons to achieve highest efficiency.

Another factor affecting efficiency of operation is the limitation of current which occurs when voltage is limited to avoid sparking.

Conventional pulsed corona reactors for controlling gaseous pollutants and particulates are usually cylindrical chambers having a thin (0.1–3.0 mm.) wire axial high-voltage electrode. Gas to be treated flows through the chamber. Pulsed streamers initiated at the wire propagate towards the chamber wall and cause reduction and decomposition of pollutants in the gas. With limited voltage, the radial electric field rapidly decreases, and the streamers' propagation and development is arrested. As a result, most of the energetic electrons are generated in close proximity to the wire. This "effective plasma volume" is localized within a volume that is only the width of a few wire radii. This limitation decreases the efficiency of corona reactors and raises the energy cost of effluent gas treatment.

Therefore, it is an object of the present invention to increase the efficiency of a corona reactor by increasing the ratio of beam-like electrons to thermal-like electrons.

Another object of the invention is to provide a structure in which streamer discharge is initiated from both electrodes of a reactor, thereby increasing "effective plasma volume".

Yet another object is to provide input pulses to a corona reactor of a repetition rate, a pulse width, and amplitude to maximize efficiency of operation of a reactor chamber in reducing pollutants such as nitrous oxide, hydrocarbons and particulates.

SUMMARY OF THE INVENTION

The foregoing and other objects are achieved by utilizing a high voltage (10–100 kV) pulse generator which produces pulses having a high repetition rate (100–10,000 Hz) and short pulse width (less than 100 ns) with rise times of about 10–20 ns. The pulse generator is impedance-matched to that of the cylindrical corona chamber through which gas to be treated flows. The chamber may have from 50 to several hundred or even a thousand ohms greater impedance than that of conventional reactors utilizing longer pulses. The electrical line connecting the pulse generator and the reactor chamber has the same impedance matching parameters for efficient coupling.

The chamber is designed such that the electrical energy is distributed over the chamber electrodes, a typical chamber length being 0.5 meters. The outer electrode is formed on the inside of the chamber wall and is about 30–75 mm in diameter. The inner electrode is an axial rod whose diameter may be from 2–10 mm On the inner wall of the chamber, the outer electrode is a hollow cylinder having an inner surface grooved to form a sawtooth configuration. The surface may be threaded or made up of an array of diaphragms, razors, combs or the like. The inner electrode also has a sawtooth shape which may be formed by a threaded rod or wire. This configuration produces initial streamer discharges from both electrodes, thus increasing the "effective plasma volume".

For different applications, the foregoing parameters may vary, but they will be related to the pulse generator and to the electrical line by calculating the impedance of the chamber, including the effect of the variation of impedance as the electrical discharge within the chamber initiates, and taking into account the effect of these on pulse rise time.

For a better understanding of the present invention, together with other objects, features and advantages, reference should be made to the following description of a preferred embodiment which should be read in conjunction with the drawing the single figure of which is a schematic diagram of a corona reactor and pulse generator built in accordance with the present invention.

DESCRIPTION OF PREFERRED EMBODIMENT

In the drawing, there is seen a pulse modulator 12 which is preferably a power pulse generator capable of supplying output pulses of different characteristics for different applications. As used herein, "high voltage" pulses are defined as those having a voltage of 10–100 kV; "rapid" pulses are those having a pulse width of 20–100 nanoseconds; a "high" pulse repetition rate is one of 100–10,000 Hz; a "short" pulse rise time is 10–20 nanoseconds; and "matching impedances" between the pulse generator and the load are 50–1,000 ohms.

A coaxial cable 13 connects the pulse modulator 12 to a reactor chamber 14 of about 0.5 meters in length. An outer electrode 18 of the chamber is formed of a hollow cylinder which may be a simple metal tube in which a thread is cut by standard machining procedures with a pitch of about 5 per inch. Rather than cutting a thread, a stack of washers formed of thin diaphragms or razors of alternating large and small inner diameter averaging about 60 mm may make up the sawtooth internal surface for the outer electrode 18. An inner electrode 20 also has a sawtooth surface which may be formed by an externally threaded steel rod, the thread being comparable to that of the outer electrode 18 or by an array of thin disks of alternating large and small diameter averaging about 6 mm.

With a gas flow through the chamber as indicated by the arrow at a rate of 1–10 liters/second at atmospheric pressure, the impedance of the reactor as an electrical load might typically be about 50 ohms. The pulse modulator 12 under such circumstances would preferably have a 50-ohm output at 30 kV operating at a repetition rate of 1,000 Hz and producing a 50 nanosecond pulse having a rise time of about 10–20 nanoseconds. The coaxial cable 13 is impedance-matched to the pulse modulator and to the chamber load. A reactor built in accordance with the foregoing description has been shown to be effective in the reduction of nitrous oxide (NO), hydrocarbons, and particulates. The energy required for NO removal was within 10–20 eV/molecules, which is an order of magnitude less than that of currently used precipitators.

To increase the volume of gas treated, the chamber 14 may be enlarged using a multi-cell design. Such a design allows more efficient use of the plasma volume and permits easier electrical impedance matching between the pulse modulator 12 and the load of the reactor chamber 14.

The invention should not be limited to the details of the preferred embodiment described, but only by the spirit and scope of the appended claims.

What is claimed is:

1. The method of treating pollutants in gases which comprises the steps of causing said gases to flow through a reactor chamber having sawtooth electrodes disposed therein, generating high-voltage pulses of short width, high repetition rate, and rapid rise time, and introducing said pulses to said reactor chamber, whereby pulsed streamer plasma discharges are initiated at said electrodes within said reactor chamber to increase the effective plasma volume and enhance pollutant reduction in said gases.

2. The method defined in claim 1 wherein said pulses are of a voltage between 10 and 100 kV, a repetition rate between 100 and 10,000 Hz, a pulse width of less than 100 ns, and a rise time less than 20 ns.

3. The method of claim 1, which includes the step of matching the impedance of said plasma reaction chamber to the source of said pulses.

4. Apparatus for treating pollutants contained in gases, comprising a plasma reaction chamber, means causing said gases to flow through said chamber, a pulse generator, means for energizing said pulse generator to produce pulses of high voltage, high repetition rate, short pulse width, and rapid rise time, a plurality of sawtooth electrodes disposed in the path of flow of said gases in said chamber, and means for coupling said generator to said chamber whereby pulsed streamer discharges are initiated at said sawtooth electrodes to increase the effective plasma reaction volume therein and decompose said gases to reduce pollutants.

5. Apparatus as defined in claim 4 wherein said pulses are of a voltage between 10 and 100 kV, a repetition rate between 100 and 10,000 Hz, a pulse width of less than 100 ns and a rise time of less than 20 ns and the impedances of said generator, said coupling means and said reaction chamber are matched.

6. Apparatus as defined in claim 4 wherein said pulses are of a voltage of 30 kV, a repetition rate of 1000 Hz, a pulse width of 50 ns and a rise time of 10–20 ns, said generator having an output impedance of 50 ohms, and said chamber having an input impedance of 50 ohms matching that of said generator.

* * * * *